Dec. 7, 1954    W. J. BROWN    2,696,583
SATURABLE REACTOR USING PERMANENT MAGNETS
Filed Aug. 17, 1949    3 Sheets-Sheet 1

INVENTOR.
WALTER J. BROWN
BY
Woodling and Krost
attys.

INVENTOR.
WALTER J. BROWN

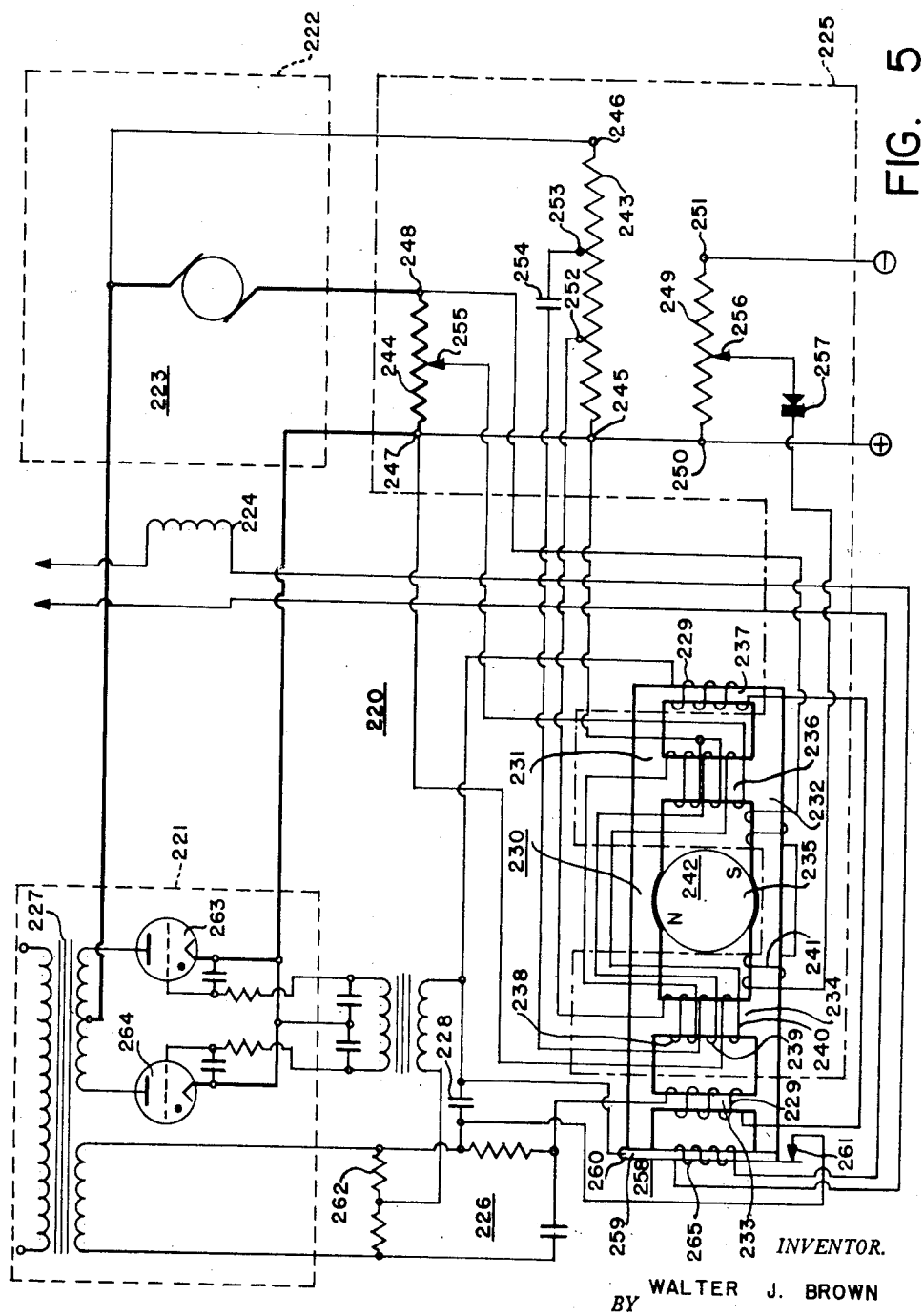

United States Patent Office 2,696,583
Patented Dec. 7, 1954

2,696,583

SATURABLE REACTOR USING PERMANENT MAGNETS

Walter J. Brown, Cleveland Heights, Ohio

Application August 17, 1949, Serial No. 110,814

34 Claims. (Cl. 321—18)

The invention relates in general to controllable devices and more particularly to static electromagnetic devices, such as saturable reactors wherein a permanent magnet is utilized to modify the degree of saturation of the permeable core of the device, such as the saturation of saturable portions of the core of the reactor.

This application is related to my copending applications filed concurrently herewith, entitled "Saturable Reactor Control Systems," and "Control Systems Using Multiple Winding Saturable Reactors."

An object of the invention is to provide a permanent magnet associated with a saturable reactor as a controlling source of asymmetric magnetizing energy.

Another object of the invention is to provide a saturable reactor having a permeable core with relatively movable parts, and including a permanent magnet whereby the saturation of the core may be varied.

Another object of the invention is to provide a magnet associated with and movable relative to the core of a saturable reactor to vary the flux density therein, preferably a cylindrical permanent magnet which may be rotated to provide controlling magnetizing energy to a saturable reactor.

Another object of the invention is to provide a controlling permanent magnet for a saturable reactor which has asymmetric magnetizing energy in opposition to that produced by a controlled direct current winding on the saturable reactor to thus produce a resultant asymmetric magnetomotive force which controls the degree of saturation of the core portions carrying the alternating current winding of the saturable reactor.

Another object of the invention is to provide in a saturable reactor having a permanent magnet supplying the controlling asymmetric magnetizing energy, a magnetically polarized armature movable upon tendency toward reversal of the asymmetric resultant magnetomotive force in at least part of the core of the reactor.

A further object of the invention is to provide a saturable reactor having a direct current winding supplying an asymmetric magnetomotive force to the core which is in series opposition to the controlling asymmetric magnetomotive force produced by a permanent magnet to thus produce a resultant differential asymmetric magnetomotive force.

A still further object of the invention is to provide in a saturable reactor a permanent magnet supplying the controlling asymmetric magnetizing energy and a magnetic shunt produced by the magnetizing energy of a direct current winding connected to a source of asymmetric electromotive force.

A further object of the invention is to provide a phase shifter which is variable by means of a saturable reactor, the saturation of which is controlled by a permanent magnet.

A further object of the invention is to provide a control system as in the preceding paragraph in which the saturable reactor is connected in any one of the phase shifting circuits described in my copending applications: "Phase Shift System," Ser. No. 770,968, filed August 28, 1947, now Patent No. 2,524,761; "Phase Shift Network," Ser. No. 770,966, filed August 28, 1947, now Patent No. 2,524,759; "Phase Shift Bridge," Ser. No. 770,967, filed August 28, 1947, now Patent No. 2,524,760; and "Phase Shift Circuit," Ser. No. 779,909, filed October 15, 1947, now Patent No. 2,524,762.

A further object of the invention is to provide, in a control system for controlling the electric power supplied to a load, a saturable reactor controlled by a permanent magnet.

A still further object of the invention is to control the power supplied by an electric space discharge power converter to a load, which may be the armature or field of an electric motor or generator, by means of a phase shifter including a saturable reactor which is controlled by a permanent magnet.

A further object of the invention is to provide, in a control system for controlling the electric power supplied to a load, a saturable reactor having a controlling source and a controlled source of asymmetric magnetizing energy, at least one of which is a permanent magnet, preferably where the energies are opposing and the reactor is controlled by the difference therebetween.

A further object is to provide means for preventing accidental reversal of the difference between the opposing magnetic energies which might cause an uncontrolled condition of the load, preferably in the form of a movable polarized armature adapted to override the control in the event of a tendency toward such reversal.

Another object of the invention is to provide in a saturable reactor, a permeable core having one or more legs each carrying an alternating current coil, one or more legs each carrying a direct current coil, and one or more legs each including a permanent magnet.

Another object is to provide in a saturable reactor, a permeable core having one or more legs each carrying an alternating current coil, and one or more legs each carrying a direct current coil and a permanent magnet.

Other objects and a fuller understanding of the invention may be had by referring to the following description and claims, taken in conjunction with the accompanying drawings, in which:

Figure 5 shows a converter controlled by a saturable reactor which has the controlling asymmetric magnetizing energy and the controlled asymmetric magnetizing energy applied to a magnetic circuit in a shunt arrangement to thus create a resultant differential flux.

Figure 1:
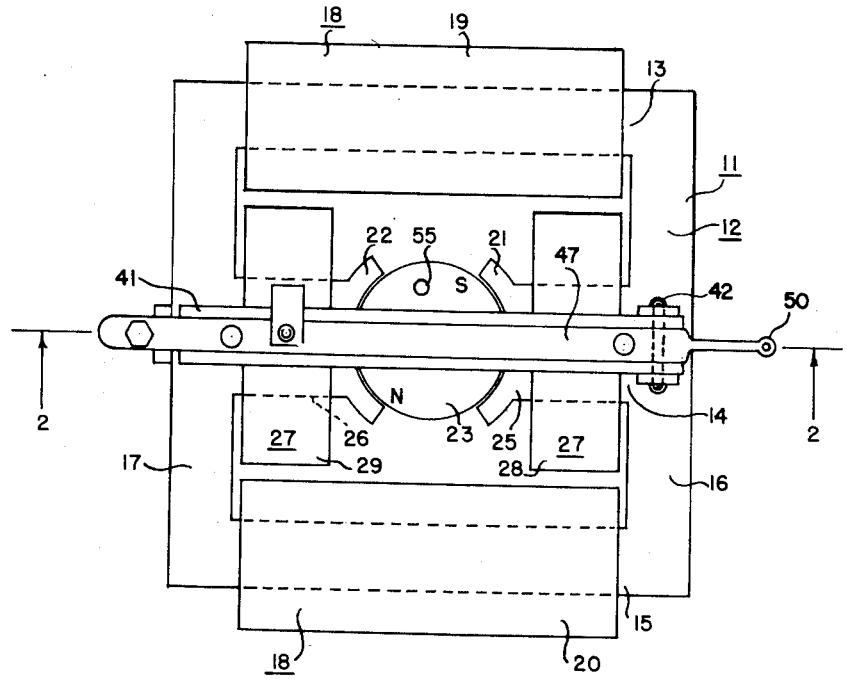
Figure 1 is a rear elevational view of a saturable reactor having controlled and controlling asymmetric magnetizing energies in series opposition and having a magnetically polarized armature controlled in movement by the polarity of the resultant differential magnetomotive force.

The Figure 1 shows one form of a saturable reactor which includes a permanent magnet as the source of controlling magnetizing energy. A saturable reactor 11 has a core 12 which comprises first, second and third legs 13, 14 and 15, respectively, joining first and second magnetic yokes or rails 16 and 17. The first and third legs 13 and 15 are designed to be saturable by asymmetric magnetomotive force and to carry the alternating current winding 18 which comprises the first and second coils 19 and 20. This alternating current winding 18 may be varied in its alternating current impedance by variations in the asymmetric saturation of the legs 13 and 15.

The second leg 14 is designed to have first and second pole pieces 21 and 22 which define an opening for a cylindrical permanent magnet 23. The magnet 23 is designed to be rotated about its axis through 90 degrees, such as by the manually operable knob 24. The second leg 14 has first and second portions 25 and 26 on which are mounted a direct current winding 27 comprising the first and second coils 28 and 29. The direct current winding 27 is designed to be connected to a source of controlled direct current or asymmetric electromotive force for establishing a controlled asymmetric magnetomotive force in the core 12.

The core 12 may be constructed in the usual manner, such as with laminations 30 fastened in any suitable manner, such as by bolts 31. The bolts 31 also hold a bracket 32 which is of some nonmagnetic substance, such as brass. The magnet 23 has bosses 33 and 34 fastened to each end thereof with a shaft 35 extending axially through the magnet 23.

Permeable pole pieces 36 and 37 are carried by the core 12 at each end of the second leg 14, such as by the bolts 31. The pole pieces 36 and 37 are used to mount a second bracket 38 of nonmagnetic material, such as brass. The shaft 35 is journaled in bearings 39 and 40 on the first and second brackets 32 and 38, respectively. A magnetically polarized armature 41 is pivotally mounted to the pole piece 36 by the pin 42. The armature 41 has a north pole 43 and a south pole 44. The north pole 43 is disposed near the pivot pin 42 and the south pole 44 is disposed near the pole piece 37. The armature 41 may optionally be provided with a spring 46 carried by the bracket 45 to assist in releasing the armature 41.

The armature 41 carries a contact strip 47 which is insulated from the armature 41 by an insulating strip 48. Both such strips may be fastened to the armature in any suitable manner, such as by the insulated rivets 49. A terminal 50 is electrically connected to the contact strip 47 near the north pole 43 of the armature 41. An adjustable contact 51 is carried by the movable end of the contact strip 47 to be actuated by movement of the armature 41. A second contact 52 disposed to cooperate with the adjustable contact 51 is carried by the pole piece 37 and insulated therefrom by insulating washers 53. A terminal 54 is electrically connected to the second contact 52 below the insulating washers 53.

Figure 2:
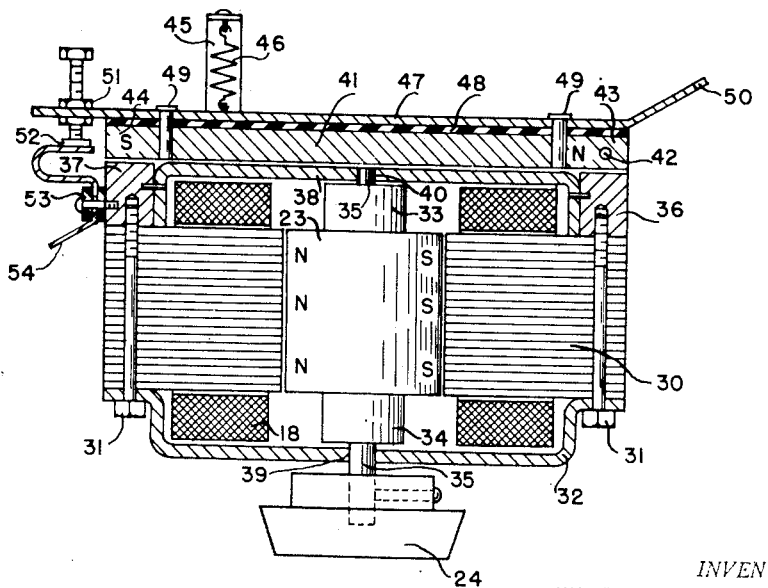
Figure 2 is the sectional view on the line 2—2 of Figure 1.

The operation of the saturable reactor 11 is effected by the rotation of the permanent magnet 23. The magnet 23 provides the controlling magnetizing energy which will modify or vary the degree of saturation of the legs 13 and 15, and hence will control the impedance of the alternating current winding 18. The direct current winding 27 is preferably energized in a manner to set up a magnetomotive force which opposes the magnetizing energy from the magnet 23, and hence these two magnetomotive forces may be characterized as being in series opposition, such as to produce a differential resultant magnetomotive force. For most applications, under normal operating conditions, the energy from the magnet 23 is greater than the magnetizing energy produced by the direct current winding 27, and hence the second magnetic yoke 17 will be polarized north relative to the magnetic yoke 16 when the magnet 23 is in the position shown in the Figures 1 and 2.

The polarized armature 41 is provided as a safety feature for the reactor 11. Under normal operating conditions the magnetic yoke 17 will be polarized north, thus making the pole piece 37 a north pole which will attract the south pole 44 of the armature 41. This will then close the contacts 51 and 52. The contacts 51 and 52 may be used to control the operation of any electrical device which is operated by or controlled by the alternating current winding 18 of the reactor 11. The purpose of the contacts 51 and 52 as controlled by the movement of the armature 41 is to prevent any unstable condition which might be caused by a tendency toward reversal of flux in the core 12. Such a tendency might occur should the permanent magnet 23 be rapidly rotated to the neutral position, which neutral position would be the one wherein the north and south poles are on a vertical line as viewed in Figure 1. In such position, the magnet 23 would thus contribute no magnetizing energy to the core 12, and hence the direct current winding 27 could then supply a magnetizing energy which would reverse the magnetomotive force in the legs 13 and 15.

The permanent magnet 23 has been shown as being cylindrical in shape which will thus permit the greatest amount of magnetizing energy to be transferred to the core 12 in any position of the magnet 23 since the air gap will remain uniform. It will be seen that the cylindrical permanent magnet has been polarized not on the axis of the cylinder, but in such a manner that the poles are diametrically opposed on the cylinder. Thus, one entire length of the cylinder 23 adjacent the pole piece 22 is magnetized as a north pole, and the entire length of the cylinder adjacent the pole piece 21 is magnetized as a south pole. It will be obvious that other shapes of permanent magnets may be utilized, a cylindrical shape being shown for its considerable advantages.

In operation when the permanent magnet 23 is rotated in a clockwise direction, as viewed in Figure 1, the energy from the magnet 23 will increase to thus increase the resultant magnetomotive force in the legs 13 and 15, thus decreasing the impedance of the alternating current winding 18. Conversely, a counterclockwise rotation of the magnet 23 will increase the impedance of the winding 18. A mechanical stop 55 has been shown protruding from the permanent magnet 23 to engage the bracket 38 to limit the rotation to 90 degrees with the neutral position as one limit. In some alternative applications it may be desirable to have the magnetomotive force of the direct current winding 27 exceed that of the magnet 23, in which case the pole piece 37 will be a south pole under normal conditions of operation. The armature 41 will then be repelled so as to open contacts 51 and 52 under normal conditions of operation. Said contacts will then be closed upon undesired reversal of the resultant asymmetric magnetomotive force.

Figure 3:
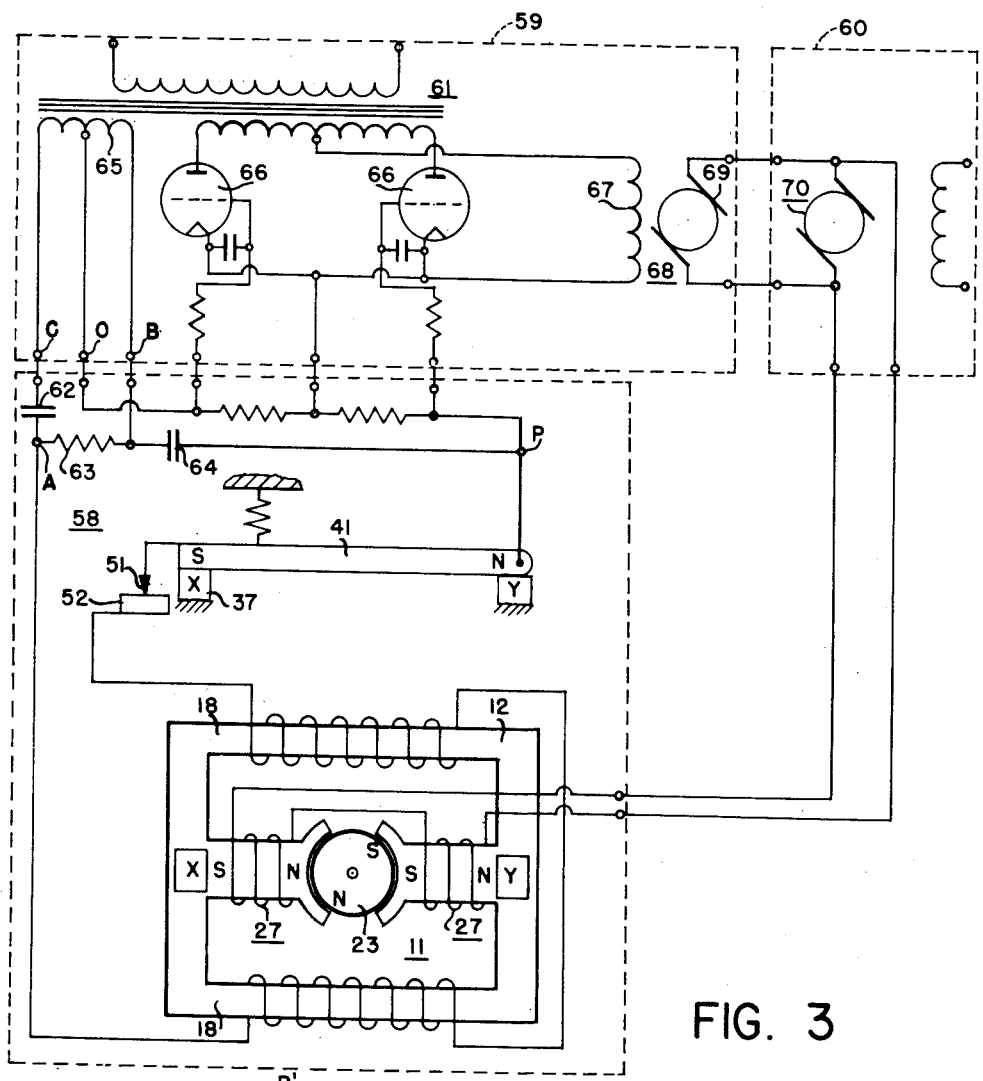
Figure 3 is a circuit diagram showing a converter controlled by a saturable reactor similar to that shown in Figures 1 and 2.

The Figure 3 is a circuit diagram showing a typical use for the saturable reactor 11. The Figure 3 is partly schematical and partly pictorial, with a diagrammatic view of the polarized armature 41 also being included in order to show the complete operation of the reactor 11. The Figure 3 shows the saturable reactor 11 as controlling the impedance of the alternating current winding 18, thereby controlling the phase of the output voltage of a phase shifter 58, in turn controlling the output of a converter 59 supplying energy to a load 60. The direct current winding 27 is passively connected to the load 60 in order to obtain therefrom a controlled asymmetric electromotive force. The term "passive connection" is considered to be one which contains no amplifier. Such passive connection may include a passive network which passive network may comprise one or more circuit elements but which includes no amplifier; however, in the Figure 3 there is shown a direct passive connection to the load 60. The direct current winding 27 may be considered as a feedback winding having impressed thereon a voltage proportional to the voltage impressed upon the load, and hence dependent upon a load condition. The load 60 has been shown as a direct current motor, and hence the voltage thereacross would be indicative of the speed of such motor.

The phase shifter 58 is similar to the phase shifter in my copending application Serial No. 779,909, filed October 15, 1947. An alternating current reference voltage obtained from terminals C and B of the secondary 65 of a transformer 61 is applied across the series combination of a condenser 62 and a resistor 63 with terminal A therebetween. Serially connected across the resistor 63 between terminals B and A is a condenser 64 and an inductance 18 which is the alternating current winding of the reactor 11. The contacts 51 and 52 are also in this electrical series circuit connection and are normally closed as long as the magnetomotive force of the magnet 23 overrides the magnetomotive force from the direct current winding 27. The phase shifter has output terminals O and P with the terminal O at the midtap of the reference voltage, which in this case is achieved by a midtap on the secondary 65 of the transformer 61. The output terminal P is connected at the juncture of the condenser 64 and inductance 18. The output voltage of the phase shifter 58 is applied in any well-known manner to control the firing angle of a pair of gaseous rectifier tubes 66 by applying voltages in phase opposition to the grids of said tubes. The output of the rectifier 66 is applied to the field 67 of a generator 68, the armature 69 of which supplies the output energy of the converter 59. The armature 69 is connected in loop circuit arrangement with the motor 70 which comprises the load 60. It will be obvious that the converter 59 may supply any form of electrical load.

Figure 4:
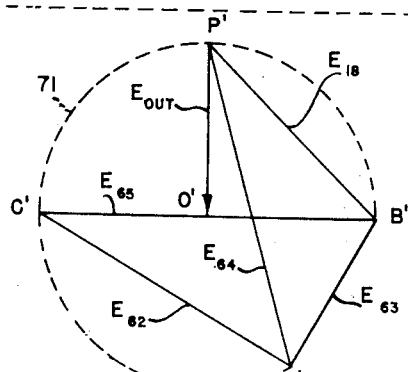
Figure 4 is a vector diagram of the alternating current voltages in the saturable reactor and phase shifter of Figure 3.

The operation of the circuit of Figure 3 will better be understood by reference to the vector diagram of Figure 4 wherein the reference voltage $E_{65}$ is the voltage applied to the phase shifter 58. Voltages $E_{62}$ and $E_{63}$ are those appearing across the condenser and resistor 62 and 63, respectively. Likewise the voltages $E_{64}$ and $E_{18}$ are those appearing across the condenser 64 and inductance 18, respectively. The potentials at the output terminals O and P are represented by the points O' and P', and the locus of the point P' lies upon the dotted arc 71 as the impedance 18 is varied. The output voltage of the phase shifter 58 is represented by the vector E_out between the points O' and P'.

The normal operating condition is with the permanent magnet 23 shown in some such position as is indicated in Figure 3 with the magnet 23 producing a magnetomotive force which exceeds the magnetomotive force developed by the direct current winding 27. Thus, the resultant differential magnetomotive force applied to the core of the reactor 11 produces a given degree of saturation to the core portions on which the alternating current winding 18 is wound, and hence a given amount of impedance in the inductance 18. This will establish the point P' at a given place on the locus 71 to establish a given output of the rectifier 66, and hence a given output of the converter 59. The motor 70 will thus run at a speed just sufficient to produce a voltage across its terminals which, when applied to the direct current winding 27, will establish the aforementioned resultant magnetomotive force. When the permanent magnet 23 is rotated in a clockwise direction, the magnetomotive force applied to the core 12 therefrom will increase, the resultant magnetomotive force in the core 12 will increase, the impedance of the alternating current winding 18 will decrease to make the output voltage of the phase shifter 58 more leading, thus, increasing the output of the rectifier 66 and the output of the converter 59. The increased voltage to the motor 70 will increase the speed thereof until the counterelectromotive force from the motor increases the voltage applied to the direct current winding 27 to a point just sufficient to maintain the required degree of saturation of the core 12 to sustain the new speed condition. Conversely, if the magnet 23 is rotated in a counterclockwise direction, the speed of the motor 70 will decrease.

The motor 70, since it has a counterelectromotive force, will have electrical inertia and should the motor be driving a load with a high mechanical inertia or an overhauling mechanical load, then in either of these cases of high mechanical or electrical inertia, the polarized armature 41 is useful to prevent unstable conditions caused by any tendency toward reversal of magnetomotive force in the core 12. Should the permanent magnet 23 be rapidly rotated in a counterclockwise direction so that the magnetizing energy from this magnet is less than the magnetizing energy produced by the direct current winding 27, then the resultant magnetomotive force may reverse which would be an unstable condition since any increase in the resultant magnetomotive force in the reverse direction would increase the output of the converter, would increase the speed of the load and thus increase the voltage applied to the winding 27 to in turn increase the resultant magnetomotive force. The polarized armature 41 is adapted to be repelled by the pole piece 37 upon reversal of the resultant magnetomotive force since this pole piece 37 would change from a north pole to a south pole. Upon such repulsion the contacts 51 and 52 would open. On the opening of these contacts the inductance 18 would be disconnected from the circuit of the phase shifter 58 which would make the output vector E_out rotate to the position in a fully lagging condition to thus reduce the output of the converter 59 to a minimum value. With this condition the voltage applied to the direct current winding 27 would quickly be reduced to a lower value, and hence the resultant magnetomotive force would be re-established in its correct direction with the pole piece 37 polarized as a north pole, and the armature 41 will again be attracted to the pole piece 37, thus reclosing contacts 51 and 52 and restoring normal operation.

In some alternative applications, the magnetomotive force from the permanent magnet 23 may need to be less than the magnetomotive force produced by the direct current winding 27, such as for example when the converter 61 is supplying the field of the motor, the armature of which is separately energized, and the direct current winding 27 is energized with a voltage proportional to the speed of the motor, or in any other case where an increased converter output will decrease the voltage feedback to the direct current winding 27. In the above-mentioned case, the resultant differential magnetomotive force in the core 12 will be reversed so that the resultant magnetomotive force is in the same direction as that produced by the direct current winding 27. With the converter 61 supplying power to a motor field in such an arrangement, should the motor speed decrease, the voltage to the direct current winding 27 would decrease which would decrease the resultant magnetomotive force and decrease the converter output to the motor field, thus increasing the motor speed. In such a circuit connection, it will be seen that the pole piece 37 will be polarized as a south pole during normal operation, and hence the armature 41 will be repelled and the contacts 51 and 52 will be open during normal operation. The contacts 51 and 52 should in this case be shunted across the inductance 18. Thus, in the event of undesired reversal of the resultant asymmetric magnetomotive force, the contacts 51 and 52 will close due to the attraction of the armature 41 to the pole piece 37, and the phase shift network 58 will shift the phase of its output voltage so that the point P' lies near the point A' to thus give full converter output and full field to the motor with consequent minimum motor speed.

The circuit of Figure 5 shows a control system 220 which in general functions somewhat similarly to the control system of the Figure 3. The control system 220 controls a converter 221 which supplies rectified alternating current power to a load 222. The load 222 is shown as a motor 223 having a separately excited field 224. The control system 220 includes generally a passive network 225 comprising a phase shifter 226 which is similar to the phase shifter used in the Figure 3. The converter 221 includes a transformer 227 which supplies energy to the rectifier tubes within the converter as well as to the phase shifter 226. The phase shifter 226 is similar to the phase shift circuit shown and described in my copending application Serial No. 779,909, filed October 15, 1947. The phase shifter 226 includes a condenser 228 and an inductance 229 which are relatively variable to shift the phase of the alternating current voltage, and hence control the output of the converter 221. In this embodiment the inductance 229 is shown as being the alternating current winding of a saturable reactor 230. The saturable reactor is designed with a permeable core which includes first and second magnetic or permeable rails or yokes 231 and 232 with first, second, third, fourth and fifth legs 233–237, inclusive, paralleled between these yokes. The first and fifth legs 233 and 237 are designed to be saturable by having a small cross sectional area and upon these legs are wound the alternating current winding 229 which is the variable inductance of the phase shifter 226. Actually, there are two separate coils forming this alternating current winding 229 but it will be understood that one coil or any number of coils may constitute such winding.

The second and fourth legs 234 and 236 preferably have a larger cross sectional area than the first and fifth legs so that the flux density in these second and fourth legs will not saturate these legs under normal operating conditions. The second and fourth legs are designed to accommodate a plurality of direct current windings which form part of the passive network 225. Generally, each of the direct current windings comprises two coils, one on each of the second and fourth legs 234 and 236. As shown in the Figure 5, the second and fourth legs have wound thereon first, second and third direct current windings 238, 239 and 240, respectively. A fourth direct current winding 241 is wound upon the second magnetic yoke 232 between the second and fourth legs, and it likewise is split into two coils, one on each side of the third leg 235.

The third leg has been shown as comprising a cylindrical permanent magnet 242 capable of being revolved about its axis. The permanent magnet 242 is polarized, not lengthwise of the cylinder, but crosswise, so that the north pole lies near a generating line in the surface of the cylinder, and the south pole lies near a diametrically opposite line in the surface of the cylinder. It will be obvious that the third leg could have short protuberances from the magnetic yokes 231 and 232 forming an opening therebetween with the permanent magnet 242 in such opening. The preferred design shown in Figure 12 permits the permanent magnet 242 to be as large as possible, and hence have a maximum of magnetizing energy.

The load 223 has a feedback impedance 243 paralleled thereacross and a series impedance 244 in series therewith for obtaining voltages corresponding to load conditions. The feedback impedance 243 has positive and negative terminals 245 and 246, respectively, and the series impedance 244 likewise has positive and negative terminals 247 and 248, respectively. A current limit potentiometer 249 having positive and negative terminals 250 and 251 is adapted to be connected to an external source of direct current or asymmetric voltage. The positive terminal 250 is connected to the positive terminal 245 of the feedback potentiometer 243, and hence it will be seen that the potentiometers 249 and 243 could be combined into one.

The first direct current winding 238 may be considered as a voltage feedback winding and is connected to a tap 252 on the feedback potentiometer 243. The positive terminals 245, 247 and 250 are interconnected to establish a reference potential. Thus, the tap 252 will be negative relative to the point of reference potential. The other end of the first direct current winding 238 is connected to the positive terminal 245 or the point of reference potential. The second direct current winding 239 may be considered as an antihunt winding and is connected between the point of reference potential and a tap 253 on the feedback potentiometer through an antihunt condenser 254. The third direct current winding 240 may be considered as a compounding winding and is connected between the point of reference potential at terminal 247 and a variable tap 255 on the series impedance 244. The fourth direct current winding 241 may be considered as a current limit winding and is connected between the negative terminal 248 of the series impedance 244 and the variable tap 256 on the current limit potentiometer 249 through a current limit rectifier 257.

The permanent magnet 242 is designed to have a magnetizing energy sufficient to exceed the magnetizing energy supplied by the feedback winding 238. The flux produced by the magnetizing energy from the feedback winding 238 is designed to act as a shunt for the flux from the permanent magnet 242 and hence divert magnetic lines of force from the first and fifth legs 233 and 237. Since the magnetizing energy from the feedback winding 238 is less than the magnetizing energy from the permanent magnet 242 it cannot shunt or divert all of the magnetic lines of force, and hence the difference between these two energies will allow a resultant flux to flow in the first and fifth legs 233 and 237, thus resulting in a given degree of asymmetric saturation of these legs during normal operating conditions.

Thus, the saturable reactor 230 may be considered to have a shunt magnetic circuit rather than a series magnetic circuit since a resultant flux or differential flux is achieved by the shunting of the flux from the permanent magnet 242 rather than by serially opposing its magnetomotive force. The permanent magnet 242 may be considered as the controlling magnetizing energy and the energy from the feedback winding 238 may be considered as the controlled magnetizing energy. The fact that the cylindrical permanent magnet 242 is revoluble on its axis permits the amount of controlling magnetizing energy to be varied, and thus the resultant or differential flux applied to the first and fifth legs 233 and 237 can be varied. By such variation the alternating current impedance of the alternating current winding 229 will vary, and thus control the phase shifter 226. The permanent magnet 242 has been shown in about an "11 o'clock" position, and if it is rotated in the clockwise direction more magnetizing energy will be applied to the entire saturable reactor 230, thus increasing the resultant flux density in the first and fifth legs 233 and 237, thus decreasing the impedance of the inductance 229 which will shift the phase of the output voltage of the phase shifter 226 in a more leading direction to thus increase the output of the converter 221 which will increase the speed of the motor 223. Conversely, counterclockwise rotation of the permanent magnet 242 will reduce the speed of the motor 223.

The antihunt winding 239 being connected through the antihunt condenser 254 will be responsive only to changes of voltage across the feedback potentiometer 243, and hence will introduce into the saturable reactor 230 a flux component which is dependent only on changes of said voltage for the purpose of stabilizing the operation of the system. The compounding winding 240, since it obtains a voltage from the series impedance 244, will introduce into the saturable reactor a flux component which is proportional to the current applied to the load and this flux component will be in opposition to that applied by the feedback winding 238 which will have the effect of increasing the resultant asymmetric flux in the first and fifth legs 233 and 237, thus increasing the converter output. The current limit winding 241 in normal operation has no voltage impressed thereon since the rectifier 257 prevents current flow until the voltage across the series impedance 244 exceeds the voltage on the current limit potentiometer 249 between the positive terminal 250 and the variable tap 256. When such event occurs, the terminal 248 will be more negative than the variable tap 256, permitting the rectifier 257 to conduct and the current limit winding 241 then impresses a magnetomotive force upon the saturable reactor 230 which opposes the magnetizing energy from the permanent magnet 242, thereby limiting the output of the converter 221 or the speed of the motor 223 to some safe value. The tap 256 is made variable to regulate the point at which this current limiting effect will occur.

A safety feature has been added to the saturable reactor 230 which includes generally a polarized control means 258 having two conditions and being responsive to a tendency toward reversal of the resultant flux in the first leg 233 to change from one to the other of these conditions. The control means 258 in this Figure 5 is shown as a magnetically polarizable armature 259. The armature 259 is pivoted at 260 near its upper end so that the lower end is free to be attracted to the second magnetic yoke 232. Contacts 261 are actuated by the armature 259 and are shown in the normally closed position with the armature 259 attracted to the second magnetic yoke 232 which normally is a south pole, thus providing the attraction. The contacts 261 are connected across the condenser 228 so that when the contacts 261 are closed, the output voltage of the phase shifter 226 is equal to the voltage across resistor 262 and the voltages applied to the grids of the converter tubes 263 and 264 lag the voltage applied to their anodes by 180 degrees, thus shutting off any output from the converter 221. A coil 265 is connected, preferably in series with the motor field 224 so as to polarize the armature 259 with a south pole at its lower, free end, only when said field 224 is energized. Upon such polarization, the armature 259 is repelled by the magnetic field existing across the leg 233 of the core, which has a south pole at its lower end due to the permanent magnet 242. Thereafter, the converter 221 can supply power to the load and this will result in an opposing magnetization of the leg 233 which, however, will not normally alter the direction of such magnetization, and accordingly the armature will normally remain repelled and the contacts 261 will remain open. The control means 258 provides an additional safety feature in the event that the permanent magnet 242 should be rapidly rotated in a counter-clockwise direction when the load 222 has either high mechanical or electrical inertia. Under such condition, it would be possible that the voltage applied to the feedback winding 238 could produce a flux which will not decrease as fast as the rapidly decreasing flux from the permanent magnet 242 and thus it may be possible for the resultant flux passing through the leg 233 to be reversed. Upon such reversal of the resultant flux in the first and fifth legs 233 and 237 an unstable condition would result, for any slight increase in resultant flux would decrease the impedance of the inductance 229 thus increasing the output of the converter 221 to increase the voltage applied to the feedback winding 238, thus increasing the resultant flux still further. The control means 258 prevents any disastrous occurrences because should the magnetizing energy produced by the feedback winding 238 exceed the magnetizing energy from the permanent magnet 242 for any reason, the left end of the second magnetic rail 232 would then become polarized with a north pole which would attract the polarized armature 259. The armature would then pivot towards the rail or yoke 232 to close the contacts 261 and thus short the condenser 228. Upon shorting the condenser 228, the output of the converter 221 will be reduced to a minimum value.

In certain applications, for example, where the converter 221 is supplying energy to the field of a motor, it will then be necessary to reverse the resultant flux in the legs 233 and 237 under conditions of normal operation. This is because with increasing field on a motor the speed decreases, and vice versa. Such an arrangement would produce a resultant flux in the legs 233 and 237 which is in the same direction as the flux which would be produced by the winding 238 alone. In this case the permanent magnet 242 may be considered as a shunt for part of the flux produced in the legs 234 and 236 by the feedback winding 238, and the remaining magnetic lines of force from the said legs 234 and 236 will circulate through the legs 233 and 237.

The operation of this particular circuit arrangement would be such that when the motor speed decreases, as with increasing load, the voltage applied to the feedback winding 238 would decrease, thus decreasing the resultant flux in the legs 233 and 237 to decrease the output of the converter 221, and hence increase the speed of the motor. It will be seen that the polarity of the magnetic yokes 231 and 232 will be reversed, and hence the polarity of the polarized armature 259 should likewise be reversed in order that this movable north pole of the armature 259 will be repelled by the magnetic yoke 232. The leads from the contacts 261 then should be provided to short the alternating current winding 229 rather than short the condenser 228 so that the converter output will increase to a maximum upon reversal of the resultant flux in the leg 233, and hence apply full field to the motor to reduce its speed to a minimum.

In this arrangement, it is preferable that the polarizing coil 265 should be connected to a separate source of asymmetric current and not in series with the motor field.

Throughout the specification, it has been stated that a permanent magnet is used as the source of controlling asymmetric magnetizing energy, but it will be clear that a permanent magnet may also or alternatively be used as the source of controlled asymmetric magnetizing energy. The position of such magnet may be controlled by mechanical connection to means varying in accordance with a load condition.

The claims appended hereto are made a part of the disclosure of this specification; and they are incorporated herein by reference.

Although the invention has been described in its preferred form with a certain degree of particularity, it is understood that the present disclosure of the preferred form has been made only by way of example and that numerous changes in the details of circuit construction and the combination and arrangement of circuit elements may be resorted to without departing from the spirit and the scope of the invention as hereinafter claimed.

What is claimed is:

1. A static electromagnetic device including a permeable core, a first portion of said core being saturable, a winding on said first portion, a permanent magnet associated with said core for modifying the saturation of said first portion, movable means for varying the amount of asymmetric magnetizing energy applied to said core by said permanent magnet, and polarized control means to inhibit the effect of reversal of the magnetomotive force in said core.

2. A controllable device including a permeable core, a first portion of said core being saturable, an alternating current winding on said first portion and controllable in impedance by the saturation of said first portion, a permanent magnet associated with said core, a second winding on said core adapted to be connected to a source of asymmetric electromotive force to establish with said magnet a resultant asymmetric flux density in said first portion, and polarized control means to inhibit the effect of reversal of the resultant asymmetric flux density in said first portion.

3. A controllable device including a permeable core, a first portion of said core being saturable, an alternating current winding on said first portion and controllable in impedance by the saturation of said first portion, a magnet associated with and movable relative to said core, a second winding on said core adapted to be connected to a source of asymmetric electromotive force to establish with said magnet a resultant asymmetric flux density in said first portion, and a polarized permeable armature cooperating with said core and having at least first and second physical positions.

4. A saturable reactor including a saturable core having three legs, an alternating current winding on the outer two of said three legs, a direct current winding on the middle of said three legs and adapted to be connected to a source of asymmetric electromotive force, wall means defining an opening in said middle leg, a cylindrical permanent magnet rotatable in said opening, the magnetomotive force of said permanent magnet being in opposition to the magnetomotive force produced by said direct current winding, a magnetically polarized armature in close proximity to said core, and an electrical switch operable by said armature.

5. A saturable reactor including a saturable core having three legs, an alternating current winding on the outer two of said three legs, a direct current winding on the middle of said three legs and adapted to be connected to a source of asymmetric electromotive force, wall means defining an opening in said middle leg, a permanent magnet movable in said opening, the magnetomotive force of said permanent magnet being in opposition to the magnetomotive force produced by said direct current winding, and polarized control means to inhibit the effect of reversal of the magnetomotive force in said core.

6. A saturable reactor having a permeable core, a first portion of said core being saturable, an alternating current winding on said first portion, means for applying asymmetric magnetizing energy to said core to establish an asymmetric magnetomotive force in said first portion, a permanent magnet associated with and movable relative to said core to establish an asymmetric magnetomotive force in said first portion which is in opposition to the magnetomotive force established by said magnetizing energy, a magnetically operable switch, and means for establishing said switch in cooperation with said core for operation of said switch upon reversal of the asymmetric magnetomotive force in said core.

7. A saturable reactor having a permeable core, a first portion of said core being saturable, an alternating current winding on said first portion, means for applying asymmetric magnetizing energy to said core to establish an asymmetric magnetomotive force in said first portion, a permanent magnet associated with and movable relative to said core to establish an asymmetric magnetomotive force in said first portion which is in opposition to the magnetomotive force established by said magnetizing energy, and control means having two alternative conditions and being responsive to a tendency toward reversal of the asymmetric magnetomotive force in said first portion to change from one to the other of said conditions.

8. A saturable reactor having a permeable core, a first portion of said core being saturable, an alternating current winding on said first portion, means for applying asymmetric magnetizing energy to said core to establish an asymmetric magnetomotive force in said first portion, and a permanent magnet associated with and movable relative to said core to establish an asymmetric magnetomotive force in said first portion which is in opposition to the magnetomotive force established by said magnetizing energy, thus producing a resultant magnetomotive force in said first portion, and a movable polarized armature cooperating with said resultant magnetomotive force and adapted to assume one of two alternative positions dependent upon the direction of said resultant.

9. A saturable reactor having a permeable core, a first portion of said core being saturable, an alternating current winding on said first portion, means for applying asymmetric magnetizing energy to said core to establish an asymmetric magnetomotive force in said first portion, a permanent magnet associated with an movable relative to said core to establish an asymmetric magnetomotive force in said first portion which is in opposition to the magnetomotive force established by said magnetizing energy, said magnetizing energy and said permanent magnet establishing magnetomotive forces in series opposition in said core to thus establish a resultant differential magnetomotive force in said first portion, and control means having two alternative conditions and being responsive to a tendency toward reversal of the resultant asymmetric magnetomotive force in said first portion to change from one to the other of said conditions.

10. A saturable reactor having a permeable core, a first portion of said core being saturable, an alternating current winding on said first portion, a permanent magnet associated with and movable relative to said core to establish an asymmetric magnetic flux in said first portion, a second portion of said core arranged as a magnetic shunt in parallel with said first portion, and a direct current winding located upon said second portion for controlling the amount of said asymmetric magnetic flux which is diverted by said second portion.

11. A saturable reactor including a saturable core having five magnetic legs paralleled between first and second magnetic yokes, an alternating current winding on the outer or first and fifth legs, a movable permanent magnet located in said third leg and creating asymmetric flux, a direct current winding on the second and fourth legs adapted to be connected to a source of asymmetric electromotive force, whereby, said second and fourth legs act as a magnetic shunt to divert a controllable part of the asymmetric flux from said permanent magnet and thus control the flux density in said first and fifth legs.

12. A saturable reactor including a saturable core having five magnetic legs paralleled between first and second magnetic yokes, an alternating current winding on the outer or first and fifth legs, a direct current winding on the second and fourth legs adapted to be connected to a source of asymmetric electromotive force, said third leg including at least a cylindrical permanent magnet rotatable about the axis thereof, said second and fourth legs acting as a magnetic shunt for the flux from said permanent magnet to thus control the flux density in said fifth legs.

13. A saturable reactor having a permeable core, having a first portion which is saturable, and a second portion, an alternating current winding on said first portion, a permanent magnet in said second portion, a direct current winding on said second portion adapted to develop a magnetomotive force in opposition to that developed by said permanent magnet, thereby producing a resultant asymmetric magnetomotive force which controls the asymmetric saturation of said first portion, an electric switch having two conditions, and magnetically polarized means cooperating with said core for operating said switch upon a tendency toward reversal of said resultant asymmetric magnetomotive force.

14. A saturable reactor having a permeable core, a first portion of said core being saturable, an alternating current winding on said first portion, means for applying asymmetric magnetizing energy to said core to establish an asymmetric magnetomotive force in said first portion, and a permanent magnet associated with and movable relative to said core to establish an asymmetric magnetomotive force in said first portion which is in opposition to the magnetomotive force established by said magnetizing energy, thus producing a resultant magnetomotive force in said first portion, a permanent magnet armature pivoted to said core and movable to attracted and repulsed positions relative to said core, and an electrical switch having on and off conditions and operable by movements of said armature upon a tendency toward reversal of the resultant magnetomotive force in said core.

15. A saturable reactor having a permeable core, a first portion of said core being saturable, an alternating current winding on said first portion, means for applying asymmetric magnetizing energy to said core to establish an asymmetric magnetomotive force in said first portion, and a permanent magnet associated with and movable relative to said core to establish an asymmetric magnetomotive force in said first portion which is in opposition to the magnetomotive force established by said magnetizing energy, thus producing a resultant magnetomotive force in said first portion, a permeable armature pivoted to said core and movable to attracted and repulsed positions relative to said core, a D. C. winding on said armature, and an electrical switch having on and off conditions and operable by movements of said armature upon a tendency toward reversal of the resultant magnetomotive force in said core.

16. An electrical control system for a power converter for supplying electric power to a load, comprising a phase shifting network operable from an alternating current source and controlling said converter, said phase shifting network including a capacitive reactance serially connected to a variable inductive reactance having one output terminal connected therebetween, means for energizing said reactances from a reference voltage derived from said alternating current source such that the potential of said output terminal lies, in a voltage vector diagram, on an arc spanning the reference voltage vector, circuit elements energized from said alternating current source, a second output terminal associated with said circuit elements such that the potential of said second output terminal lies, in the vector diagram, within the space bounded by said reference voltage vector and said arc, a core in said inductive reactance, a movable permanent magnet forming part of the inductive reactance to produce a variable magnitude magnetomotive force in said core, a direct current winding on said core, and means for deriving directly from the load a voltage representative of a desired operating condition thereof and applying same to said direct current winding to produce a magnetomotive force in opposition to said first-mentioned magnetomotive force, the difference between said magnetomotive forces establishing a resultant asymmetric magnetomotive force in said core.

17. The combination of claim 16 including polarized control means to inhibit the effect of reversal of the resultant asymmetric magnetomotive force in said core.

18. The combination of claim 17 wherein the polarized control means is a polarized permeable armature.

19. The combination of claim 18 including electrical connections and an electric switch operable by said armature to dominate the phase shifting network in the control of the power supplied to said load.

20. An electromagnetic control system operable from an alternating current source, for an electric power converter having output terminals and control terminals, comprising, a saturable reactor having a permeable core, an alternating current winding on said core, and a direct current winding on said core, a permanent magnet movable in relation to said core and creating an asymmetric magnetomotive force in said core, impedance elements and connections between said elements, said alternating current winding, said control terminals and said alternating current source, and other connections between said direct current winding and said output terminals for creating an asymmetric current in said direct current winding and a corresponding asymmetric magnetomotive force in said core.

21. The combination of claim 20, in which the power converter comprises a space discharge device and in which the impedance elements and the alternating current winding are connected so as to constitute a phase shifting network.

22. An electromagnetic system for controlling the electric power supplied by a power converter to a load, comprising, a saturable reactor having a permeable core, an alternating current winding on a first portion of said core, a direct current winding on said core and a permanent magnet movable in relation to said core, impedance elements and connections from said elements to said alternating current winding and to said converter for controlling same, and means for connecting said alternating current winding and said elements to an alternating current source, connections from said direct current winding to said load for producing in said first core portion an asymmetric magnetomotive force which opposes the magnetomotive force produced by said permanent magnet, the difference between said magnetomotive forces establishing a resultant asymmetric magnetomotive force in said first core portion.

23. The combination of claim 22 in which the power converter comprises a space discharge device and in which the impedance elements and the alternating current winding are connected so as to constitute a phase shifting network.

24. The combination of claim 22 including polarized control means to inhibit the effects of reversal of the resultant magnetomotive force.

25. An electromagnetic control system operable from an alternating current source for a converter having control terminals and supplying electric power to a load circuit, comprising, a saturable reactor having a permeable core and an alternating current winding and a plurality of direct current windings on said core, a permanent magnet associated with said core and creating an asymmetric magnetomotive force in said core, impedance elements and connections between said elements, said alternating current winding, said control terminals, and said alternating current source, connections between one said direct current winding and said load circuit for creating in said core an asymmetric magnetomotive force dependent upon a condition of the load, and connections between another of said direct current windings and said load circuit for creating in said core an asymmetric magnetomotive force dependent upon another condition of the load.

26. The combination of claim 25 in which one direct current winding is connected effectively in parallel with at least a part of the load and another direct current winding is connected effectively in series with at least a part of the load.

27. The combination of claim 26 in which the connections to the two direct current windings are such that the asymmetric magnetomotive forces created in the core by said windings are both in opposition to the magnetomotive force created by the permanent magnet.

28. The combination of claim 26 in which the connections to the said two direct current windings are such that the asymmetric magnetomotive force created in the core by one of said windings is in opposition to the magnetomotive force created by the permanent magnet, while the asymmetric magnetomotive force created in the core by the other of said windings is in the same direction as that created by the permanent magnet.

29. The combination of claim 25, in which the converter comprises a space discharge device and the impedance elements and the alternating current winding comprise a phase shifting network.

30. The combination of claim 25 including polarized control means to inhibit the effect of reversal of the resultant of the several magnetomotive forces created in the core.

31. A control system operable from an alternating current source, for an electric power converter having output terminals and control terminals, comprising an electromagnetic structure having a permeable core, an alternating current winding on said core, and a direct current winding on said core, a permanent magnet movable in relation to said core and creating an asymmetric magnetomotive force in said core, connections between said output terminals and said direct current winding for creating an asymmetric current in said direct current winding and a corresponding asymmetric magnetomotive force in said core, impedance elements, and means for connecting said elements and said alternating current winding to said control terminals and to said alternating current source to control said converter.

32. An electromagnetic control system operable from an alternating current source, for an electric power converter having output terminals and control terminals, comprising, a saturable reactor having a permeable core, an alternating current winding on said core, and a direct current winding on said core, a permanent magnet movable in relation to said core and creating an asymmetric magnetomotive force in said core, impedance elements, means for connecting said elements and said alternating current winding to said control terminals and to said alternating current source to control said converter, and other connections between said direct current winding and said output terminals for creating an asymmetric current in said direct current winding and a corresponding asymmetric magnetomotive force in said core.

33. A system for controlling the electric power supplied by a power converter to a load, comprising, an electromagnetic structure having a permeable core, a permanent magnet movable in relation to said core and forming therewith a first magnetic circuit, an alternating current winding on said first magnetic circuit, a direct current winding on said first magnetic circuit, impedance elements and connections from said elements to said alternating current winding and to said converter for controlling same, and means for connecting said alternating current winding and said elements to an alternating current source, connections from said direct current winding to said load for producing in said first magnetic circuit an asymmetric magnetomotive force which opposes the magnetomotive force produced by said permanent magnet, the difference between said magnetomotive forces establishing a resultant asymmetric magnetomotive force in said first magnetic circuit.

34. An electromagnetic system for controlling the electric power supplied by a power converter to a load, comprising, a saturable reactor having a permeable core, movable in relation to said core and forming therewith a first magnetic circuit, an alternating current winding on said first magnetic circuit, a direct current winding on said first magnetic circuit, impedance elements and connections from said elements to said alternating current winding and to said converter for controlling same, and means for connecting said alternating current winding and said elements to an alternating current source, connections from said direct current winding to said load for producing in a first portion of said magnetic circuit an asymmetric magnetomotive force which opposes the magnetomotive force produced by said permanent magnet, the difference between said magnetomotive forces establishing a resultant asymmetric magnetomotive force in said first portion of said magnetic circuit.

References Cited in the file of this patent

UNITED STATES PATENTS

| Number | Name | Date |
|---|---|---|
| 1,788,152 | Dowling | Jan. 6, 1931 |
| 2,053,154 | Pierre | Sept. 1, 1936 |